United States Patent
Murata

(10) Patent No.: US 12,118,802 B2
(45) Date of Patent: Oct. 15, 2024

(54) REMOTE OPERATION DEVICE, REMOTE DRIVING SYSTEM, REMOTE OPERATION METHOD, AND NON-TRANSITORY COMPUTER-READABLE MEDIUM STORING A REMOTE OPERATION PROGRAM

(71) Applicant: TOYOTA JIDOSHA KABUSHIKI KAISHA, Toyota (JP)

(72) Inventor: Yuki Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/811,440

(22) Filed: Jul. 8, 2022

(65) Prior Publication Data
US 2023/0057848 A1   Feb. 23, 2023

(30) Foreign Application Priority Data
Aug. 23, 2021   (JP) .................... 2021-135921

(51) Int. Cl.
*G06V 20/58*   (2022.01)
*B60W 40/09*   (2012.01)

(52) U.S. Cl.
CPC ............. *G06V 20/58* (2022.01); *B60W 40/09* (2013.01); *B60W 2420/403* (2013.01); *B60W 2554/4048* (2020.02); *B60W 2554/4049* (2020.02)

(58) Field of Classification Search
CPC ....... G06V 20/58; G06V 20/56; B60W 40/09; B60W 2420/403; B60W 2554/4048; B60W 2554/4049; G05D 1/0038

USPC .......................................................... 382/104
See application file for complete search history.

(56) References Cited

U.S. PATENT DOCUMENTS

| | | | |
|---|---|---|---|
| 11,150,642 B2* | 10/2021 | Mori | G05D 1/0022 |
| 11,204,604 B2* | 12/2021 | Otaka | H04W 4/48 |
| 11,876,980 B2* | 1/2024 | Gerke | H04N 19/167 |
| 2015/0187224 A1* | 7/2015 | Moncrief | G09B 9/052 434/30 |
| 2018/0249086 A1* | 8/2018 | Ozawa | G02B 27/0172 |
| 2019/0156150 A1* | 5/2019 | Krishnan | G06V 40/70 |
| 2019/0227327 A1* | 7/2019 | Abou Shousha | G02B 27/0179 |
| 2022/0080826 A1* | 3/2022 | Shoji | B60K 35/22 |
| 2023/0057848 A1* | 2/2023 | Murata | G06V 20/56 |

FOREIGN PATENT DOCUMENTS

| | | | |
|---|---|---|---|
| JP | 2004287285 A | * | 10/2004 |
| JP | 2010173492 A | * | 8/2010 |
| JP | 2017122713 A | * | 7/2017 |
| JP | 2019053553 A | * | 4/2019 |

(Continued)

*Primary Examiner* — Mahendra R Patel
(74) *Attorney, Agent, or Firm* — Dickinson Wright, PLLC

(57) ABSTRACT

A remote operation device that drives a vehicle by remote operation exterior to the vehicle, including: an image acquiring section that acquires an image surroundings of the vehicle from the vehicle; a first display portion that displays the image of the surroundings; and second display portions that are provided at peripheral visual field regions, which are other than a central visual field region of the first display portion, at at least one of an upper side or a lower side of the first display portion, and that display objects that move from the central visual field region side toward transverse direction end portions.

7 Claims, 18 Drawing Sheets

(56) References Cited

FOREIGN PATENT DOCUMENTS

| JP | 2019161549 A | * | 9/2019 | ............... B60R 1/00 |
| JP | 6673371 B2 | * | 3/2020 | ........... B64C 39/024 |
| WO | WO-2018022523 A1 | * | 2/2018 | ............. A61B 34/25 |
| WO | WO-2019017216 A1 | * | 1/2019 | ............ B60W 10/04 |
| WO | WO-2020054458 A1 | * | 3/2020 | ............ B60W 40/08 |

\* cited by examiner

REMOTE OPERATION DEVICE, REMOTE DRIVING SYSTEM, REMOTE OPERATION METHOD, AND NON-TRANSITORY COMPUTER-READABLE MEDIUM STORING A REMOTE OPERATION PROGRAM

CROSS-REFERENCE TO RELATED APPLICATION

This application claims priority under 35 USC 119 from Japanese Patent Application No. 2021-135921, filed on Aug. 23, 2021, the disclosure of which is incorporated by reference herein.

BACKGROUND

Technical Field

The present disclosure relates to a remote operation device, a remote driving system, a remote operation method, and a non-transitory computer-readable medium storing a remote operation program.

Related Art

Japanese Patent Application Laid-Open (JP-A) No. 2010-173492 proposes placing a pair of liquid crystal displays, which extend in the front-rear direction, at the vehicle cabin side surface of the roof of a vehicle, and displaying thereon Gaussian blobs that move at a speed corresponding to the vehicle speed. Due to the driver viewing the motion of the Gaussian blobs in his/her peripheral visual field, the driver can intuitively recognize the vehicle speed without the driving operation being disturbed.

In recent years, there has been the demand for remote driving techniques that operate a vehicle from a remote location by operation in a driving operation room or the like that is at the exterior of the vehicle. In the driving operation room, an image corresponding to the visual field seen from (the driver's seat of) the vehicle is displayed on a monitor.

It has been thought to employ the prior art in order for the operator in the driving operation room to obtain a sense of the vehicle speed at the time of remote driving.

However, when employing the above-described prior art, in cases in which liquid crystal displays for displaying Gaussian blobs are separately needed, or in cases in which the sightline of the operator becomes offset to the left or the right from straight ahead such as at the time of turning the vehicle or the like, the central visual field of the operator enters into a Gaussian blob, and there is the possibility that that the operator will not be able to sufficiently obtain a sense of the vehicle speed.

SUMMARY

The present disclosure provides a remote operation device, a remote driving system, a remote operation method, and a non-transitory computer-readable medium storing a remote operation program, by which an operator who is in the midst of remote driving operation may obtain a sense of the vehicle speed even at times when the vehicle turns.

A first aspect of the present disclosure is A remote operation device that drives a vehicle by remote operation exterior to the vehicle, including: an image acquiring section that acquires an image surroundings of the vehicle from the vehicle; a first display portion that displays the image of the surroundings; and second display portions that are provided at peripheral visual field regions, which are other than a central visual field region of the first display portion, at at least one of an upper side or a lower side of the first display portion, and that display objects that move from the central visual field region side toward transverse direction end portions.

In the first aspect, the remote operation device that operates a vehicle from the vehicle exterior has the image acquiring section that acquires an image of surroundings of the vehicle from the vehicle, the first display portion that displays the image of surroundings of the vehicle, and the second display portions that are provided at peripheral visual field regions, which are other than the central visual field region of the first display portion, and at the upper side, or the lower side, or the upper side and the lower side of the first display portion. Objects that move from the central visual field region side toward the transverse direction end portions are displayed in the second display portions.

Here, second display portions that are provided at the upper portion, or at the lower portion, or at the upper portion and the lower portion of within the first display portion are included in the "second display portions that are provided . . . at an upper side or at a lower side or at an upper side and a lower side of the first display portion".

Further, "central visual field region" is the region on the first display portion that corresponds to the central visual field of the operator of the remote operation device.

In this way, by causing the objects to move on the second display portions from the central visual field region side toward the transverse direction end portions, the operator may be made to feel a sense of the speed of the vehicle that is the object of operation.

In particular, even in a case in which the sightline of the operator moves to the left or the right, the objects are displayed only in the second display portions that are provided at the upper sides, or the lower sides, or the upper sides and the lower sides of the peripheral visual field regions that are other than the central visual field region on the first display portion. Namely, the objects that are displayed in the second display portions are prevented from entering into the central visual field of the operator, and a deterioration in the ability of the operator to see the image of surroundings may be prevented or suppressed, and the operator may obtain a sense of the vehicle speed.

A second aspect of the present disclosure, in the above-described first aspect, may further include: a steering angle information acquiring section acquiring that acquires steering angle information of the vehicle; and a central visual field region setting section that sets the central visual field region on the basis of the steering angle information.

In accordance with the second aspect, the central visual field region of the first display portion is set (changed) on the basis of steering angle information of the vehicle that is acquired by the steering angle information acquiring section. For example, in a case in which the vehicle is turning left, the operator grasps the situation ahead of the left turn by directing his/her sightline further toward the left side than the vehicle front side. Namely, at the time of a left turn of the vehicle, the central visual field of the operator is displaced toward the left side.

Thus, in the present aspect, the central visual field region on the first display portion is set (is displaced in the transverse direction) on the basis of the steering angle (information) of the vehicle. The second display portions are provided at the upper side or at the lower side, or at the upper side and the lower side, of the peripheral visual field regions of the first display portion that are other than the central visual field region. Due thereto, for example, an object, which is displayed on the second display portion, entering into the central visual field of the operator who has moved his/her sightline to the left side at the time of a left turn of the vehicle, and the ability of the operator to view the image of surroundings of the vehicle deteriorating, may be prevented or suppressed.

A third aspect of the present disclosure, in the above-described first aspect, may further include: a sightline information acquiring section that acquires sightline information, with respect to the first display portion, of an operator of the remote operation device; and a central visual field region setting section that sets the central visual field region on the basis of the sightline information.

In accordance with the third aspect, the central visual field region of the operator is set (changed) on the basis of sightline information (the sightline direction) of the operator that is acquired by the sightline information acquiring section. For example, in a case in which the vehicle is turning left, the operator grasps the situation ahead of the left turn by directing his/her sightline further toward the left side than the vehicle front side. Namely, at the time of a left turn of the vehicle, the central visual field of the operator is displaced toward the left side.

Thus, in the present aspect, the central visual field region on the first display portion is set (is displaced in the transverse direction) on the basis of the sightline (information) of the operator. The second display portions are provided at the upper side, or at the lower side, or at the upper side and the lower side, of the peripheral visual field regions of the first display portion that are other than the central visual field region. Due thereto, for example, an object, which is displayed on the second display portion, entering into the central visual field of the operator who has moved his/her sightline to the left side at the time of a left turn of the vehicle, and the ability of the operator to view the image of surroundings of the vehicle deteriorating, may be prevented or suppressed.

In the fourth aspect of the present disclosure, in the above-described second or third aspect, the central visual field region setting section may set the central visual field region on the basis of a distance from an eyepoint of an operator of the remote operation device to the first display portion.

In accordance with the fourth aspect, the central visual field region at the first display portion is set on the basis of the distance from the eyepoint of the operator to the first display portion.

The central visual field of the operator is a range of a predetermined angle that is centered on the sightline direction from the eyepoint of the operator. Accordingly, the central visual field region on the first display portion may be set accurately on the basis of a predetermined angle, whose center is the sightline direction from the eyepoint of the operator, and the distance from the eyepoint of the operator to the first display portion.

In a fifth aspect of the present disclosure, in any one of the above-described first through fourth aspects, a moving speed of the objects may change in accordance with a vehicle speed of the vehicle.

In accordance with the fifth aspect, the moving speed of the objects that are displayed in the second display portions changes in accordance with the vehicle speed. Accordingly, the operator may actually experience (the changes in) the vehicle speed merely by visually recognizing the objects that are displayed in the second display portions.

A sixth aspect of the present disclosure is a remote driving system including: the remote operation device of any one of the first through fifth aspects; and a vehicle driven by operation of the remote operation device.

In accordance with the sixth aspect, the remote driving system has the above-described remote operation device, and a vehicle that is operated by the remote operation device. Therefore, the vehicle may be operated well, while the operator obtains a sense of the vehicle speed.

A seventh aspect of the present disclosure is a remote operation method for driving a vehicle by remote operation exterior to the vehicle, the method including, via a computer: causing an image acquiring section to acquire, from the vehicle, an image of surroundings of the vehicle; causing a first display portion to display the image of the surroundings of the vehicle; and causing second display portions that are provided at peripheral visual field regions, which are other than a central visual field region of the first display portion, at at least one of an upper side or a lower side of the first display portion, to display objects that move from the central visual field region side toward transverse direction end portions.

In accordance with the seventh aspect, in the same way as in the first aspect, the operator may feel a sense of the speed of the vehicle that is the object of operation. Further, even in a case in which the sightline of the operator moves to the left or the right, the objects are prevented from entering into the central visual field of the operator, and a deterioration in the ability of the operator to see the image of surroundings may be prevented or suppressed.

An eighth aspect of the present disclosure is a non-transitory computer-readable medium storing a remote operation program executable by a computer to execute processing at a remote operation device that drives a vehicle by remote operation exterior to the vehicle, the processing including: causing an image acquiring section to acquire, from the vehicle, an image of surroundings of the vehicle; causing a first display portion to display the image of surroundings of the vehicle; and causing second display portions that are provided at peripheral visual field regions, which are other than a central visual field region of the first display portion, at at least one of an upper side or a lower side of the first display portion, to display objects that move from the central visual field region side toward transverse direction end portions.

In accordance with the eighth aspect, in the same way as in the first aspect, the operator may feel a sense of the speed of the vehicle that is the object of operation. Further, even in a case in which the sightline of the operator moves to the left or the right, the objects are prevented from entering into the central visual field of the operator, and a deterioration in the ability of the operator to see the image of surroundings may be prevented or suppressed.

In accordance with the above-described aspects, in the remote operation device, the remote driving system, the remote operation method, and the non-transitory computer-readable medium storing a remote operation program of the present disclosure, an operator who is in the midst of remote driving operation may obtain a sense of the vehicle speed, even at times when the vehicle turns.

BRIEF DESCRIPTION OF THE DRAWINGS

Exemplary embodiments will be described in detail based on the following figures, wherein.

DETAILED DESCRIPTION

A remote operation system 10 relating to an exemplary embodiment is described hereinafter by using FIG. 1 through FIG. 13.

Figure 1:
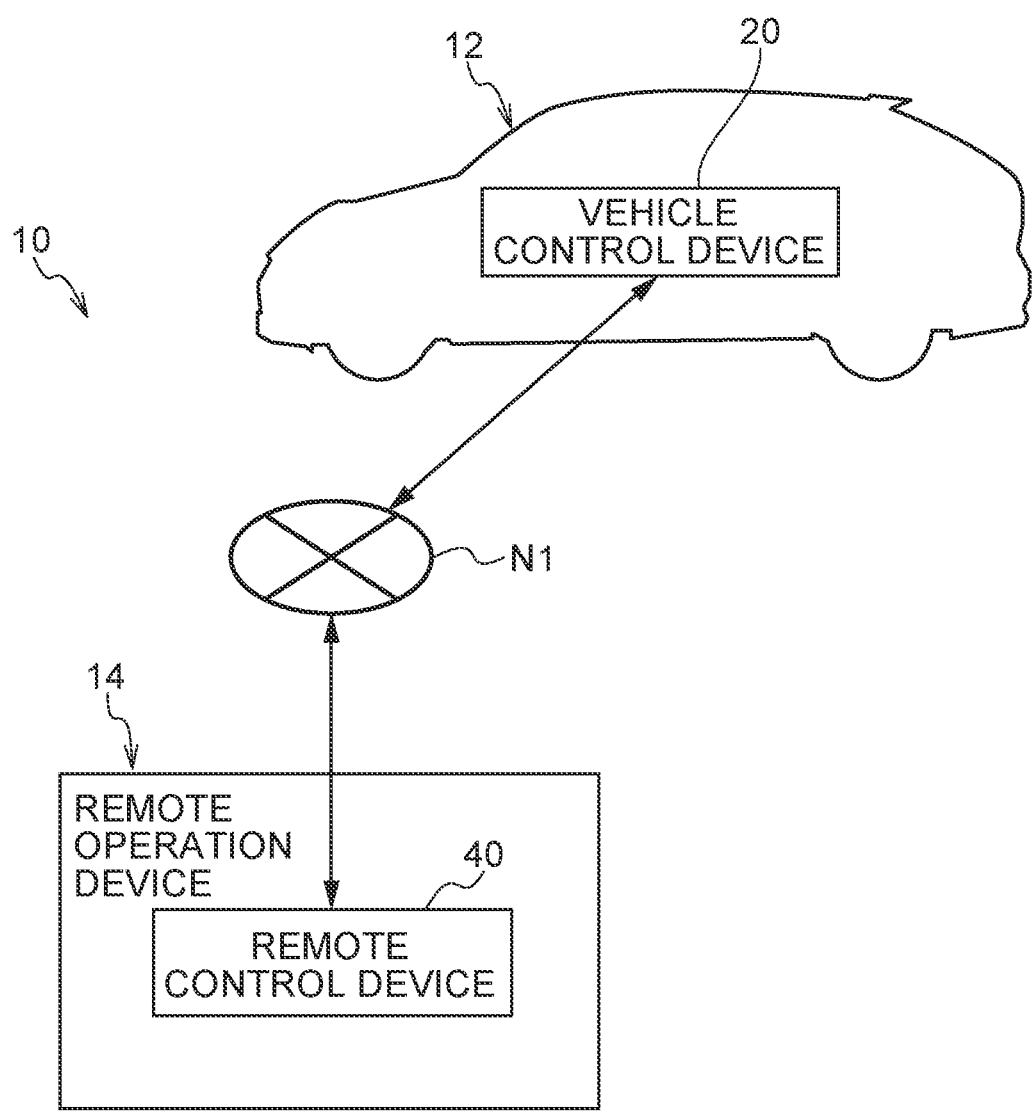
FIG. 1 is a schematic drawing illustrating schematic configuration of a remote operation system relating to an exemplary embodiment.

As illustrated in FIG. 1, the remote operation system 10 relating to the present exemplary embodiment is configured to include a vehicle 12 and a remote operation device 14.

A vehicle control device 20 is installed in the vehicle 12. The remote operation device 14 includes a remote control device 40. In this remote operation system 10, the vehicle control device 20 of the vehicle 12 and the remote control device 40 of the remote operation device 14 are connected via network N1 so as to be able to communicate with one another. This network N1 is, as an example, a wired or wireless communication network using a public communication circuit such as the internet or the like.

The vehicle 12 is configured such that manual driving that is based on the driving operations of a driver who is an occupant of the vehicle 12, and remote driving that is based on the driving operations of an operator of the remote operation device 14 (a remote driver), can be executed. Note that the vehicle 12 is usually set to the manual driving mode.

Figure 2:
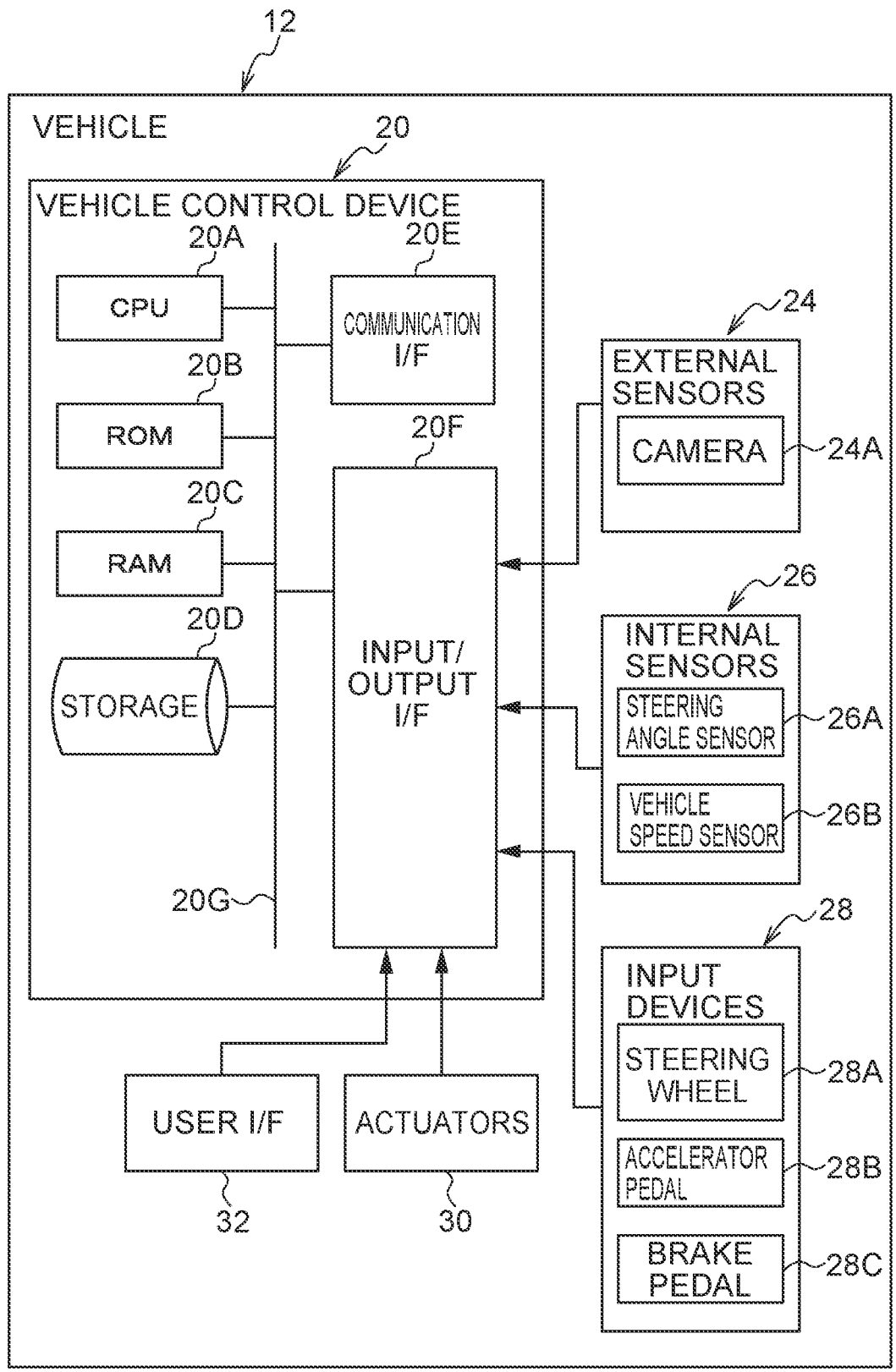
FIG. 2 is a block drawing illustrating hardware configuration of a vehicle.

FIG. 2 is a block drawing illustrating hardware configuration of equipment installed in the vehicle 12. The vehicle 12 includes external sensors 24, internal sensors 26, input devices 28, actuators 30 and a user I/F (Inter Face) 32, in addition to the above-described vehicle control device 20.

As illustrated in FIG. 2, the vehicle control device 20 is configured to include a CPU (Central Processing Unit) 20A, a ROM (Read Only Memory) 20B, a RAM (Random Access Memory) 20C, a storage 20D, a communication I/F (Inter Face) 20E and an input/output I/F 20F. The CPU 20A, the ROM 20B, the RAM 20C, the storage 20D, the communication I/F 20E and the input/output I/F 20F are connected via a bus 20G so as to be able to communicate with one another.

Figure 3:
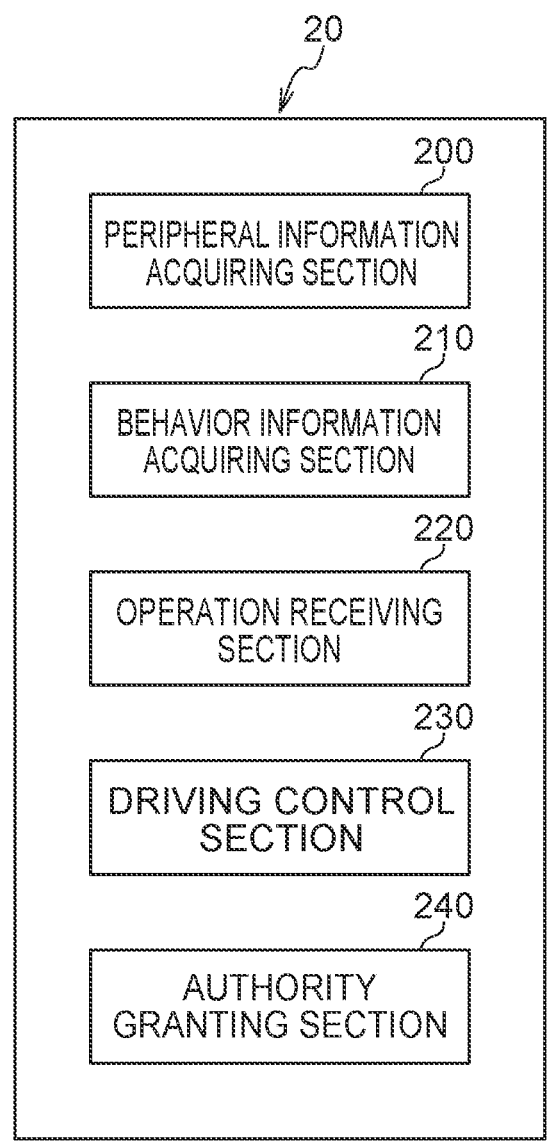
FIG. 3 is a block drawing illustrating functional configuration of a vehicle control device that the vehicle has.

The CPU 20A is a central computing processing unit, and executes various programs and controls various sections. Namely, the CPU 20A reads-out programs from the ROM 20B, and executes the programs by using the RAM 20C as a workspace. In the present exemplary embodiment, programs are stored in the ROM 20B. Due to the CPU 20A executing a program, the vehicle control device 20 functions as a peripheral information acquiring section 200, a behavior information acquiring section 210, an operation receiving section 220, a driving control section 230 and an authority granting section 240, as illustrated in FIG. 3.

As illustrated in FIG. 2, the ROM 20B stores various programs and various data. The RAM 20C temporarily stores programs and data as a workspace. The storage 20D is configured by an HDD (Hard Disk Drive) or an SSD (Solid State Drive), and stores various programs, including the operating system, and various data. The communication I/F 20E includes an interface for connection to the network N1, in order to communicate with the remote control device 40. A communication standard such as, for example, LTE, WiFi, or the like is used as this interface.

The communication I/F 20E of the present exemplary embodiment transmits images captured by a camera 24A and information relating to the traveling state of the vehicle that is detected by the internal sensors 26, to the remote operation device 14 that is at the exterior of the vehicle 12, and receives remote operation information, which is operation information for operating the vehicle 12, from the remote operation device 14. Note that an unillustrated microphone is attached to the camera 24A, and data of sounds, which are recorded together with the captured images, is transmitted and received together with the data of the captured images.

The input/output I/F 20F is an interface for communicating with various devices that are installed in the vehicle 12. The external sensors 24, the internal sensors 26, the input devices 28, the actuators 30 and the user I/F 32 are connected via the input/output I/F 20F to the vehicle control device 20 of the present exemplary embodiment. Note that the external sensors 24, the internal sensors 26, the input devices 28, the actuators 30 and the user I/F 32 may be directly connected to the bus 20G.

The external sensors 24 are a group of sensors that detect peripheral information of the periphery of the vehicle 12. These external sensors 24 include the camera 24A that captures images of a predetermined range.

The internal sensors 26 are a group of sensors that detects the traveling state of the vehicle 12. These internal sensors 26 include a steering angle sensor 26A that detects the operated amount of the steering wheel, and a vehicle speed sensor 26B that detects the speed of the vehicle.

The input devices 28 are a group of switches that are operated by a vehicle occupant who is riding in the vehicle 12. The input devices 28 include a steering wheel 28A that serves as a switch that steers the steered wheels of the vehicle 12, an accelerator pedal 28B that serves as a switch that accelerates the vehicle 12, and a brake pedal 28C that serves as a switch that decelerates the vehicle 12.

The actuators 30 include a steering wheel actuator that drives the steered wheels of the vehicle 12, an accelerator actuator that controls the acceleration of the vehicle 12, and a brake actuator that controls the deceleration of the vehicle 12.

The user I/F 32 includes a display and speakers (none of which are illustrated). The display is disposed, for example, at the instrument panel of the vehicle 12, and configures an electrostatic capacitance type touch panel. The speakers are disposed, for example, at the left and right side doors of the vehicle 12, respectively.

FIG. 3 is a block drawing illustrating an example of functional configuration of the vehicle control device 20. As illustrated in FIG. 3, the vehicle control device 20 has the peripheral information acquiring section 200, the behavior information acquiring section 210, the operation receiving section 220, the driving control section 230, and the authority granting section 240. These respective functional configuration are realized by the CPU 20A reading-out a program that is stored in the ROM 20B, and executing the program.

The peripheral information acquiring section 200 has the function of acquiring peripheral information of the periphery of the vehicle 12. The peripheral information acquiring section 200 acquires peripheral information of the vehicle 12 from the external sensors 24 via the input/output I/F 20F. A forward surrounding image (hereinafter called "surrounding image") of the vehicle 12 that is captured by the camera 24A is included in this peripheral information.

The behavior information acquiring section 210 has the function of acquiring behavior information relating to the behavior of the vehicle such as steering angle information, vehicle speed information, and the like of the vehicle 12. The behavior information acquiring section 210 acquires behavior information of the vehicle 12 from the internal sensors 26 via the input/output I/F 20F.

The operation receiving section 220 has the function of receiving signals that are outputted from the respective input devices 28, in cases in which manual driving that is based on operations of a vehicle occupant of the vehicle 12 is carried out. The operation receiving section 220 generates vehicle operation information that is operation information for controlling the actuators 30, on the basis of the signals received from the respective input devices 28.

The driving control section 230 has the function of controlling remote driving that is based on remote operation information received (acquired) from the remote operation device 14, and manual driving that is based on vehicle operation information received from the operation receiving section 220.

The authority granting section 240 has the function of granting operational authority, which is the authority to operate the vehicle in which the vehicle control device 20 is installed, to the operator who operates the remote operation device 14. When granting the operational authority to the operator, the vehicle control device 20 transmits an authority granting signal to the remote operation device 14 that that operator is operating. Due to the operational authority being transferred from the vehicle 12 to the remote operation device 14, at the vehicle 12, the vehicle 12 is made to travel on the basis of remote operation information received from the remote operation device 14. Namely, remote driving by the operator is carried out.

Further, when the remote driving by the remote operation device 14 is to be ended, the authority granting section 240 transmits, to the remote operation device 14, a handover notification signal for giving notice that the operational authority will be transferred to the vehicle 12. At the remote operation device 14 that receives the handover notification signal, ending processing for ending the remote driving is executed.

Figure 4:
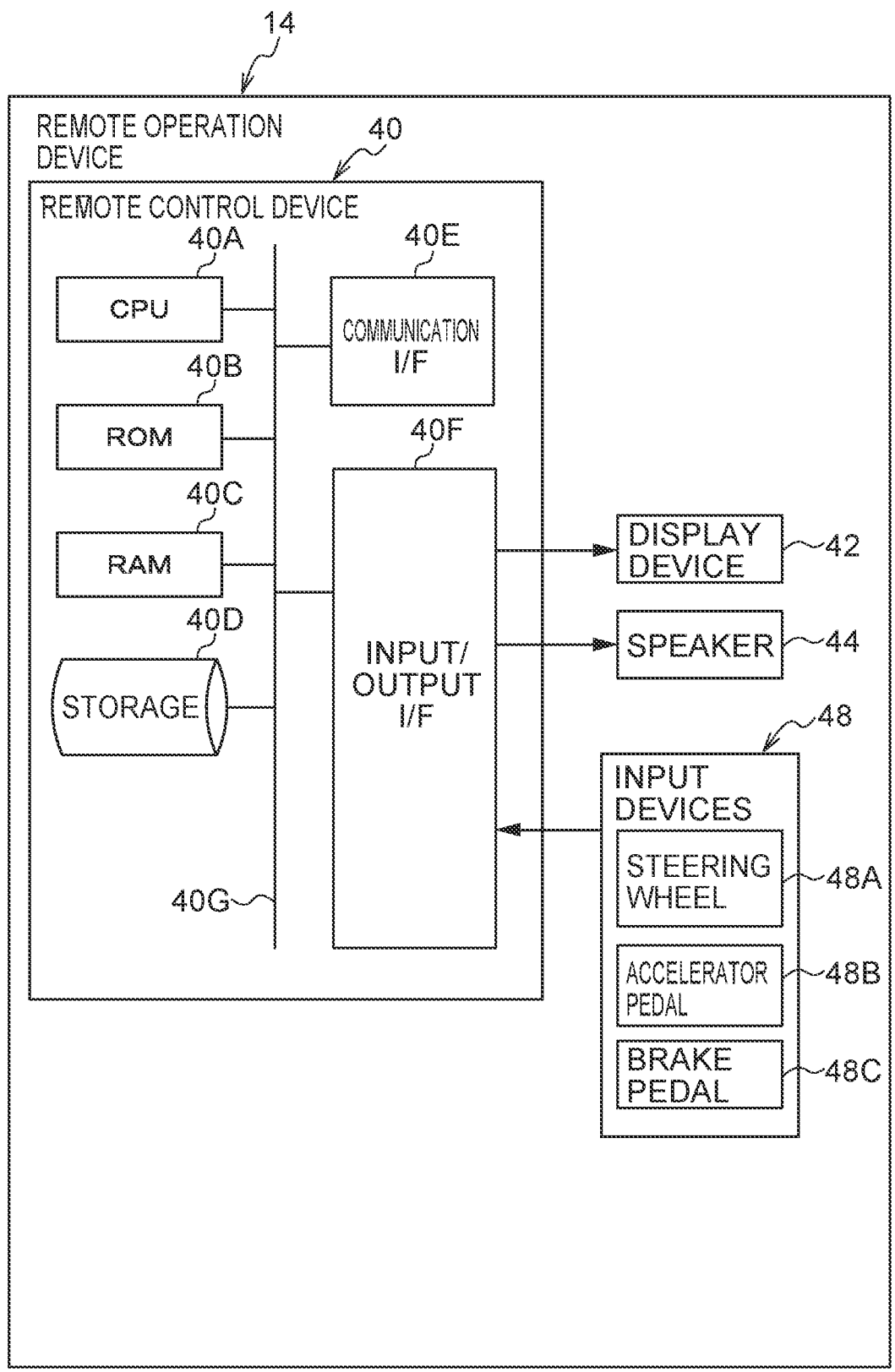
FIG. 4 is a block drawing illustrating hardware configuration of a remote operation device.

FIG. 4 is a block drawing illustrating hardware configuration of equipment that are installed in the remote operation device 14 of the present exemplary embodiment. The remote operation device 14 includes a display device 42, a speaker 44, and input devices 48 serving as an operating section, in addition to the above-described remote control device 40.

The remote control device 40 is configured to include a CPU 40A, a ROM 40B, a RAM 40C, a storage 40D, a communication I/F 40E and an input/output I/F 40F. The CPU 40A, the ROM 40B, the RAM 40C, the storage 40D, the communication I/F 40E and the input/output I/F 40F are connected via a bus 40G so as to be able to communicate with one another. The functions of the CPU 40A, the ROM 40B, the RAM 40C, the storage 40D, the communication I/F 40E and the input/output I/F 40F are the same as those of the CPU 20A, the ROM 20B, the RAM 20C, the storage 20D, the communication I/F 20E and the input/output I/F 20F of the above-described vehicle control device 20.

Figure 5:
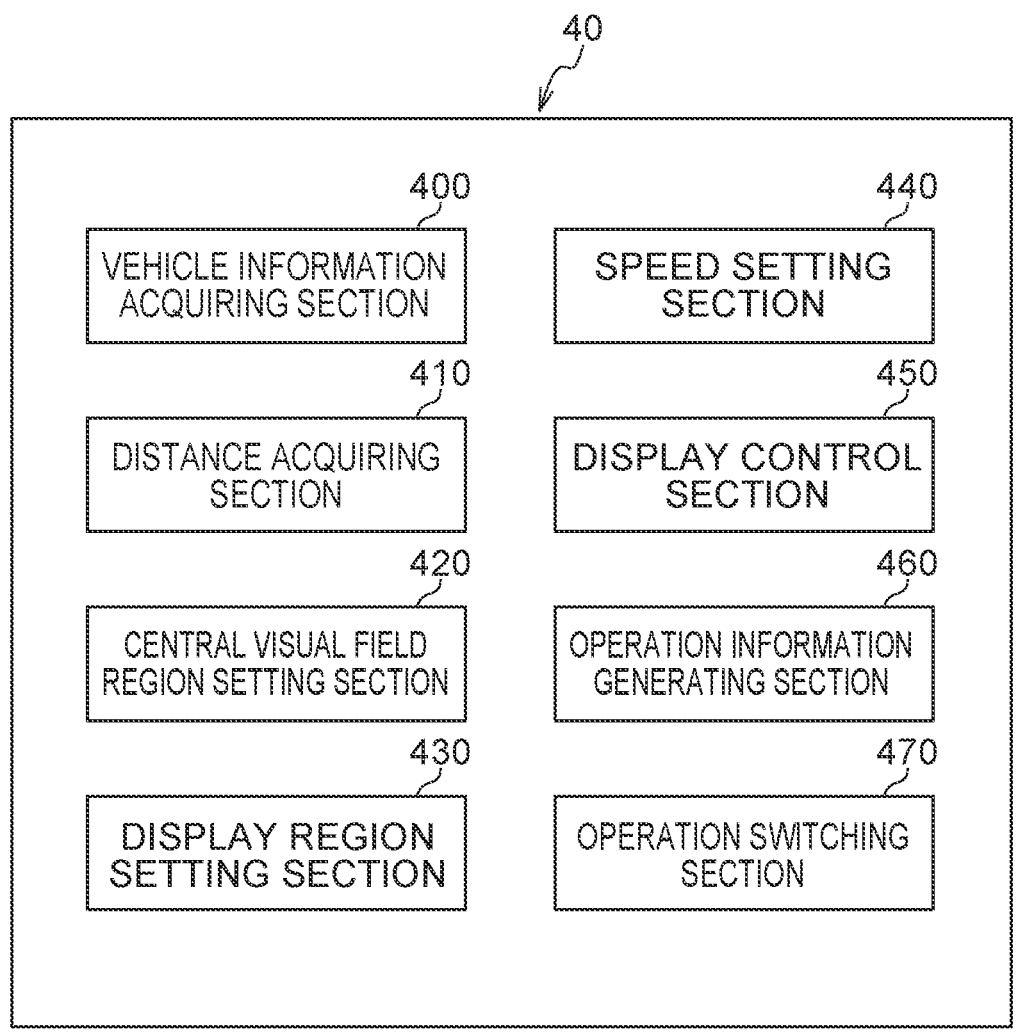
FIG. 5 is a block drawing illustrating functional configuration of a remote control device that the remote operation device has.

The CPU 40A reads-out programs from the ROM 40B, and executes the programs by using the RAM 40C as a workspace. In the present exemplary embodiment, the programs are stored in the ROM 40B. Due to the CPU 40A executing a program, the remote control device 40 functions as a vehicle information acquiring section 400, a distance acquiring section 410, a central visual field region setting section 420, a display region setting section 430, a speed setting section 440, a display control section 450, an operation information generating section 460, and an operation switching section 470 that are illustrated in FIG. 5.

The display device 42, the speaker 44 and the input devices 48 are connected via the input/output I/F 40F to the remote control device 40 of the present exemplary embodiment. Note that the display device 42, the speaker 44 and the input devices 48 may be direct connected to the bus 40G.

Figure 6:
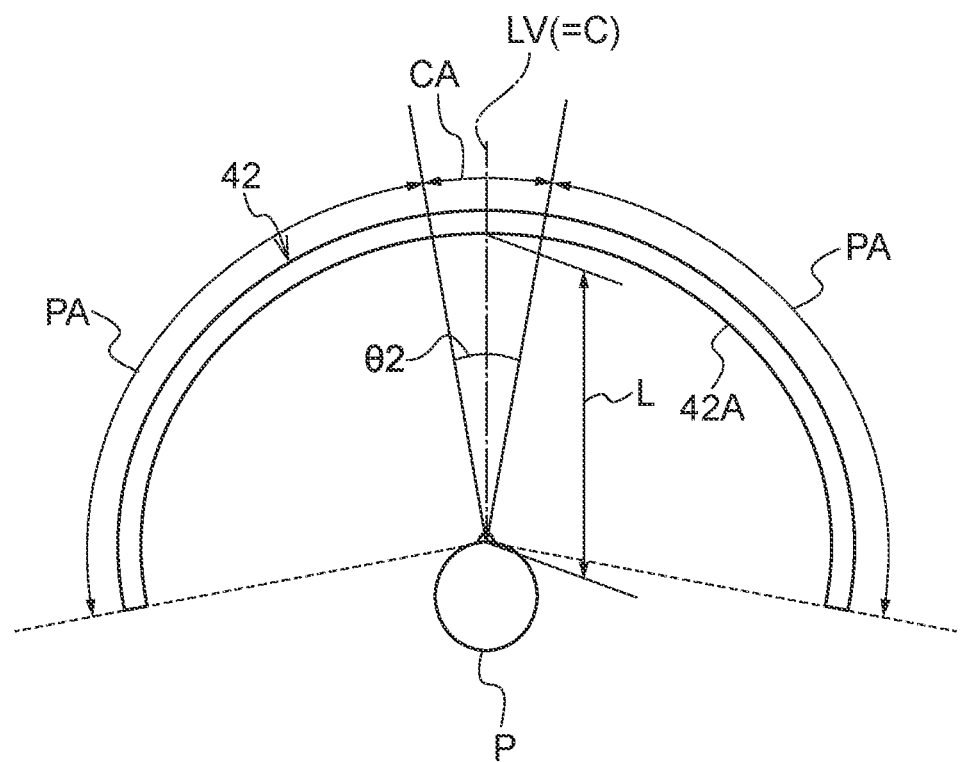
FIG. 6 is a schematic plan view in which a display device is viewed from above.

The display device 42 is a liquid crystal display for displaying the image of surroundings of the vehicle 12 that is captured by the camera 24A of the vehicle 12, and various types of information relating to the vehicle 12. As illustrated in FIG. 6, the display device 42 is disposed in front of an operator P (only the head portion of which is illustrated) who is seated in an operation seat (not illustrated) in a remote operation room (not illustrated), and, as seen in a plan view, is a shape that is curved in a substantial arc shape. Namely, an image display surface 42A of the display device 42 extends from one side of the operator P via the region in front of the operator P to the other side. Accordingly, this is a structure in which the image of surroundings of the vehicle 12 is displayed over the entire range of the visual field of the operator P who is facing straight ahead.

Figure 7:
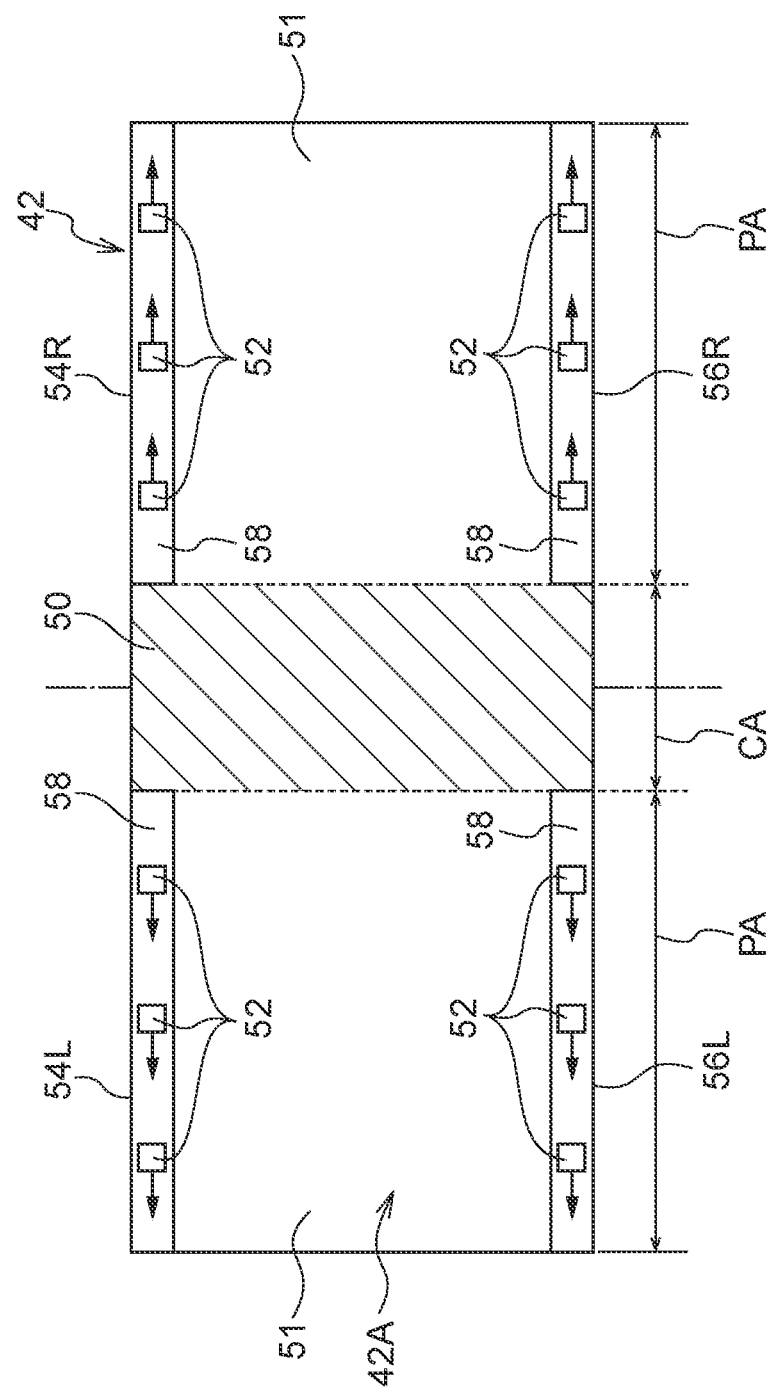
FIG. 7 is a drawing in which an image display surface of the display device is expanded.

Further, the image display surface 42A at the inner side of the display device 42 is rectangular in a state of being expanded planarly as illustrated in FIG. 7. The image of surroundings can be displayed on the entirety of the image display surface 42A. Objects 52 and backgrounds 58 are displayed in a superposed manner on object display regions 54L, 54R, 56L, 56R (hereinafter called "object display regions 54L through 56R" upon occasion) that are described later and that are set at the four corners of the image display surface 42A. Note that the image display surface 42A corresponds to the "first display portion". Further, the object display regions 54L through 56R correspond to the "second display portions".

The speaker 44 outputs sounds that are recorded together with the captured images by the microphone that is attached to the camera 24A of the vehicle 12.

The input devices 48 are controllers for operation by the operator who uses the remote operation device 14. The input devices 48 include a steering wheel 48A that serves as a switch that steers the steered wheels of the vehicle 12, an accelerator pedal 48B that serves as a switch that accelerates the vehicle 12, and a brake pedal 48C that serves as a switch that decelerates the vehicle 12. Note that the forms of the respective input devices 48 are not limited to these. For example, a lever switch may be provided instead of the steering wheel 48A. Further, for example, push button switches or lever switches may be provided instead of the pedal switches of the accelerator pedal 48B and the brake pedal 48C.

FIG. 5 is a block drawing illustrating an example of the functional configuration of the remote control device 40. As illustrated in FIG. 5, the remote control device 40 has the vehicle information acquiring section 400, the distance acquiring section 410, the central visual field region setting section 420, the display region setting section 430, the speed setting section 440, the display control section 450, the operation information generating section 460 and the operation switching section 470.

The vehicle information acquiring section 400 has the function of acquiring the image of surroundings of the vehicle 12 (hereinafter called "surrounding image") that is the captured image of the camera 24A, recorded sounds, and vehicle information such as vehicle speed information, steering angle information and the like, which are transmitted from the vehicle control device 20. The captured image that is acquired is displayed on the image display surface 42A of the display device 42, and the recorded sounds are outputted from the speaker 44. Note that the vehicle information acquiring section 400 corresponds to the "image acquiring section", the "steering angle information acquiring section" and the "vehicle speed information acquiring section".

The distance acquiring section 410 acquires distance L from the eyepoint of the operator P, who is seated in the operation seat (not illustrated) of the remote operation room, to the image display surface 42A of the display device 42. In the present exemplary embodiment, the distance L is measured in advance, and a numerical value for each operator P is stored in the storage 40D. Accordingly, due to the operator P being specified, the distance L to the image display surface 42A of the display device 42 is acquired from the storage 40D.

Note that the distance from the eyepoint of the operator P to the image display surface 42A of the display device 42 may be detected by a distance sensor or the like.

Figure 8:
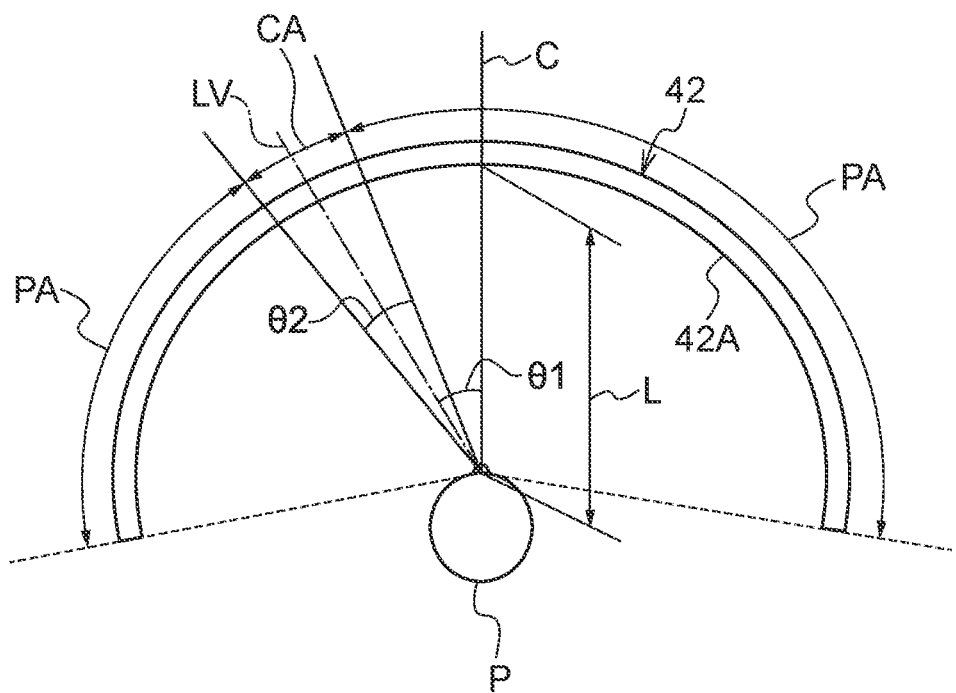
FIG. 8 is a schematic plan view in which the display device at the time of a left turn operation is viewed from above.

The central visual field region setting section 420 considers a direction, which is inclined to the left or the right by an amount corresponding to the steering angle of the vehicle 12 from the direction straight ahead of the operator P as seen in a plan view, to be the sightline direction, and sets a range, whose center is this sightline direction and that is a predetermined angle as seen in plan view from the eyepoint of the operator P, as a central visual field region 50. Specifically, as illustrated in FIG. 8, the direction, which is inclined to the left or the right by an amount corresponding to steering angle θ 1 from straight ahead direction C of the operator, is used as sightline direction LV, and the central visual field region 50 (refer to the hatched portion in FIG. 9) on the image display surface 42A of the display device 42 is set on the basis of the distance L, which is from the eyepoint of the operator P to the image display surface 42A of the display device 42, and visual field angle θ 2 (in the present exemplary embodiment, 20° as seen in plan view) of the central visual field whose center is the sightline direction LV.

The display region setting section 430 sets the regions at which the objects 52 (see FIG. 7) are to be displayed on the image display surface 42A of the display device 42. Specifically, as illustrated in FIG. 7, the display region setting section 430 sets, on the image display surface 42A, the ranges of a predetermined distance from the upper ends of the left and right both side portions (peripheral visual field regions 51), which are other that the central visual field region 50, to be the object display regions 54L, 54R at the upper side, and sets the ranges of a predetermined distance from the lower ends to be the object display regions 56L, 56R at the lower side.

The speed setting section 440 sets the moving speed of the objects 52 heading from the central visual field region 50 side toward the left and right both end sides, such that it appears to the operator as if the objects 52 are moving at a constant speed corresponding to the vehicle speed in the object display regions 54L through 56R. Specifically, the speed setting section 440 reads-out the moving speed of the objects 52 that corresponds to the vehicle speed, from a table which is stored in advance in the storage 40D and in which are set relationships of correspondence between vehicle speeds and moving speeds of the objects 52.

The display control section 450 displays the acquired surrounding image on the entirety of the image display surface 42A of the display device 42, and displays the objects 52, which move at a predetermined speed corresponding to the vehicle speed, in the object display regions 54L through 56R of the image display surface 42A, in a manner of being superposed on the image of surroundings.

Note that, in the present exemplary embodiment, the display control section 450 displays the backgrounds 58 that are a single color in the entireties of the object display regions 54L through 56R, in a manner of being superposed on the image of surroundings.

The operation information generating section 460 has the function of receiving signals outputted from the respective input devices 48, in a case in which remote driving based on operations of an operator is carried out. Further, on the basis of the signals received from the respective input devices 48, the operation information generating section 460 generates remote operation information that is to be transmitted to the vehicle control device 20.

The operation switching section 470 has the function of controlling switching of the remote driving of the vehicle 12. Specifically, in a case of acquiring an authority granting signal from the vehicle 12, the operation switching section 470 executes processing for carrying out remote driving of the vehicle 12. Further, in a case of acquiring a handover notification signal from the vehicle 12, the operation switching section 470 executes ending processing that ends the remote driving of the vehicle 12.

The flows of control at the vehicle 12 and the remote operation device 14, which structure the remote operation system 10, are described next by using FIG. 10 through FIG. 13.

Figure 10:
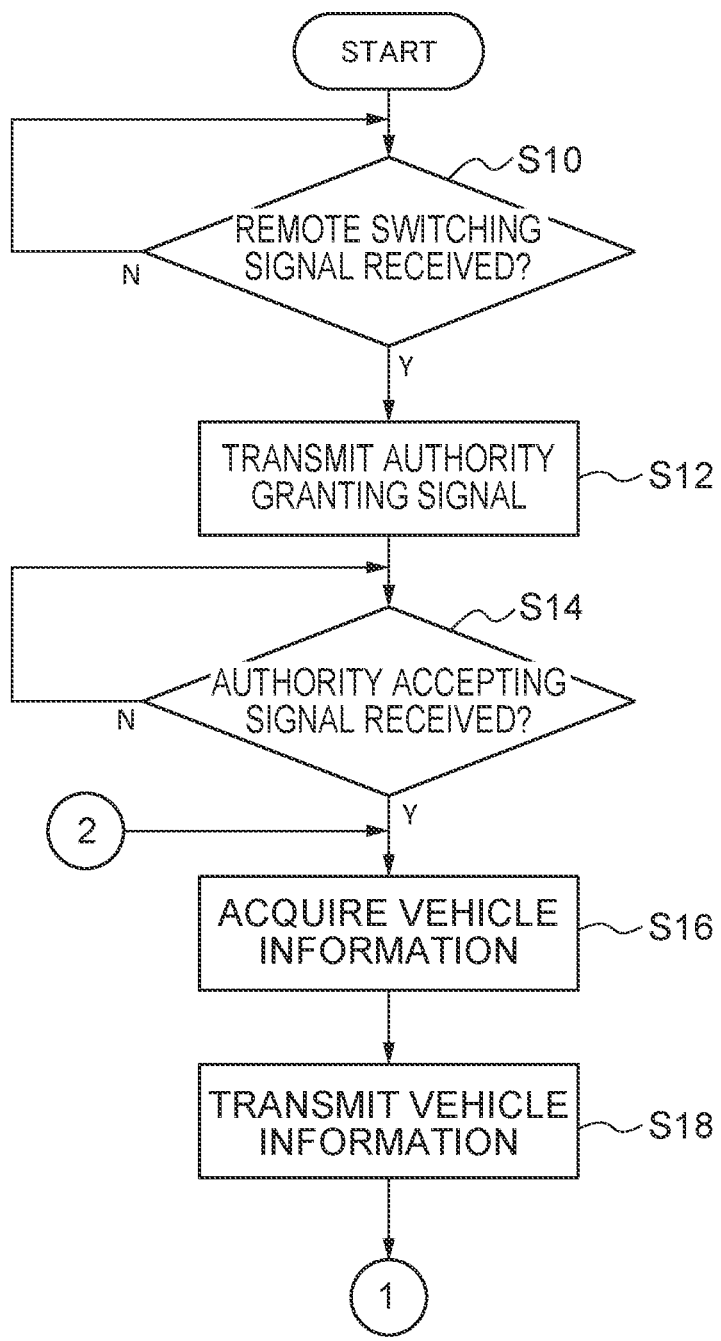
FIG. 10 is a flowchart illustrating the flow of processing that is executed by the vehicle control device.
Figure 11:
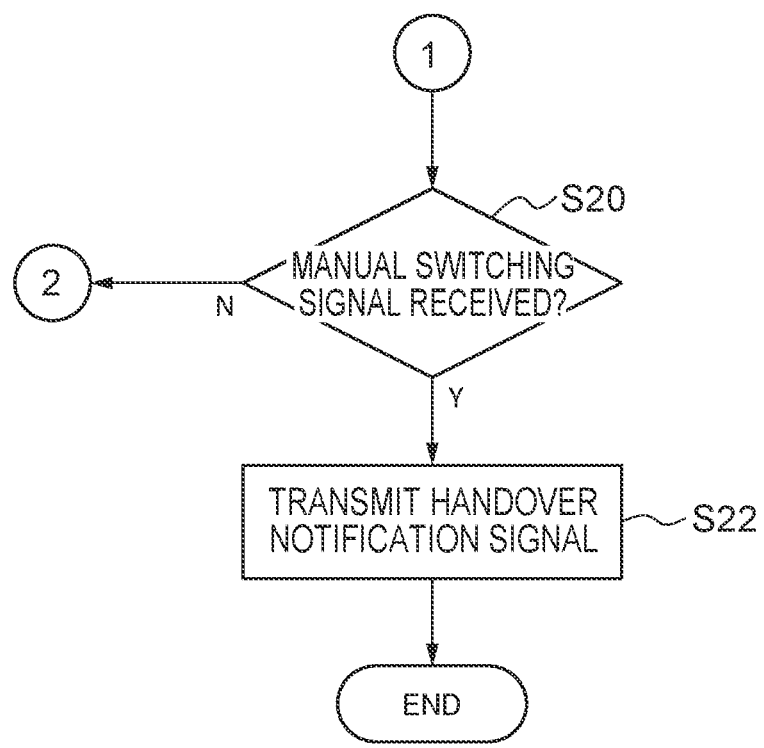
FIG. 11 is a flowchart illustrating the flow of processing that is executed by the vehicle control device.

First, the flow of processing that is executed at the vehicle control device 20 of the vehicle 12 is described by using the flowcharts of FIG. 10 and FIG. 11. Note that, in the description of this processing, description is omitted of the point that, due to general remote operation, i.e., due to the input devices 48 of the remote operation device 14 being operated, remote operation information is transmitted from the remote control device 40 to the vehicle control device 20, and the actuators 30 of the vehicle 12 are controlled on the basis thereof. Namely, the control for displaying the objects 52 on the display device 42 at the remote operation device 14 is described.

In step S10 of FIG. 10, the CPU 20A judges whether or not a vehicle occupant of the vehicle 12 has selected remote driving. Specifically, the CPU 20A judges whether or not a remote switching signal has been received. If this judgment is affirmative, the routine moves on to next step S12, and, if this judgment is negative, the processing of step S10 is repeated.

In a case in which the routine moves on to step S12, the CPU 20A transmits an authority granting signal to the remote control device 40.

In step S14, the CPU 20A judges whether or not an authority accepting signal has been received from the remote control device 40. If this judgment is affirmative, the routine moves on to next step S16, and, if this judgment is negative, the processing of step S14 is repeated.

In step S16, the CPU 20A generates vehicle information that is formed from the image of surroundings captured by the camera 24A, and behavior information that includes the steering angle information and the vehicle speed information that were detected by the steering angle sensor 26A and the vehicle speed sensor 26B respectively at the time the image was captured.

In next step S18, the CPU 20A transmits the generated vehicle information to the remote control device 40.

Moreover, in step S20 of FIG. 11, the CPU 20A judges whether or not a vehicle occupant of the vehicle 12 has selected manual driving. Specifically, the CPU 20A judges whether or not a manual switching signal has been received. If this judgment is affirmative, the routine moves on to step S22, and, if this judgment is negative, the processings from step S16 on are repeated.

In a case in which the routine moves on to step S22, the CPU 20A transmits a handover notification signal to the remote control device 40, and ends the series of processings.

The flow of processing that is executed at the remote operation device 14 is described next by using the flowcharts of FIG. 12 and FIG. 13.

Figure 12:
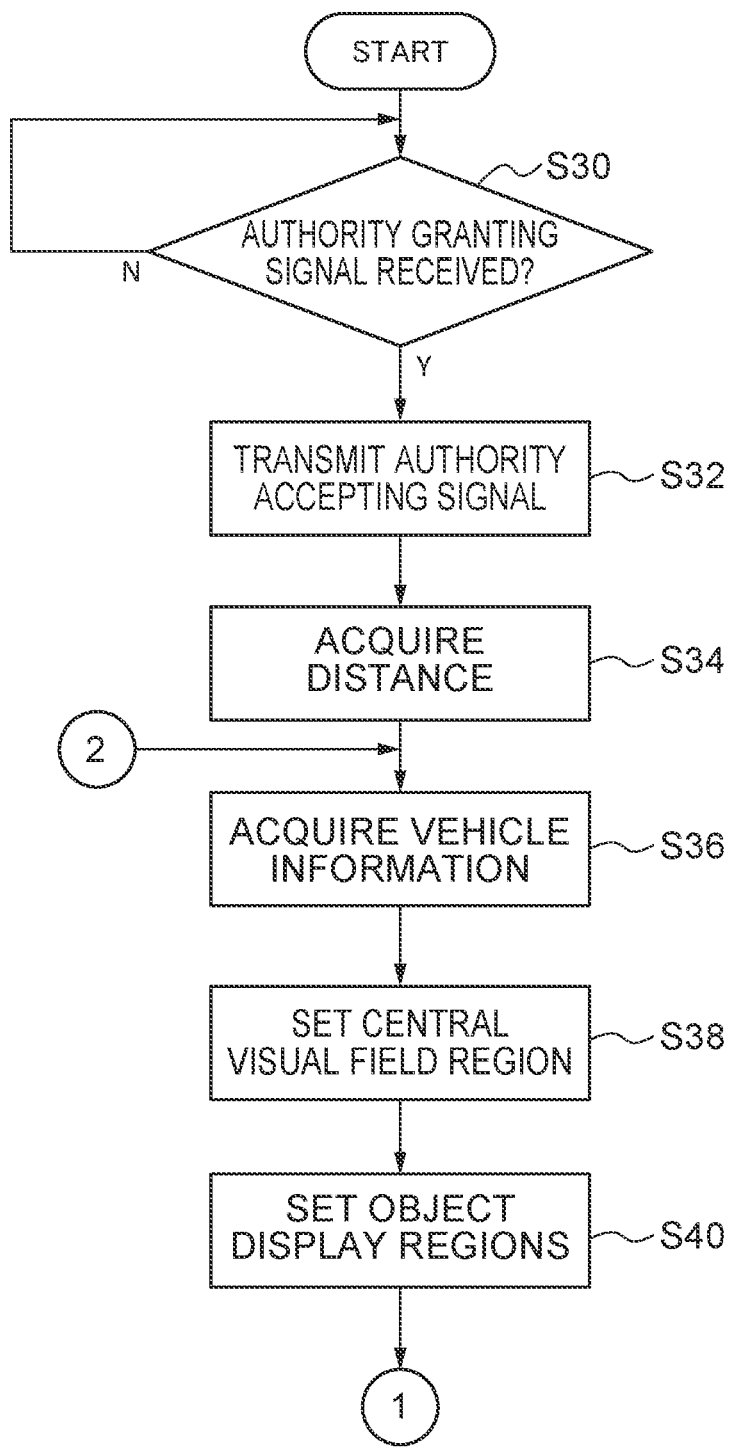
FIG. 12 is a flowchart illustrating the flow of processing that is executed by the remote operation device.

In step S30 of FIG. 12, the CPU 40A judges whether or not an authority granting signal has been received. If this judgement is affirmative, the routine moves on to next step S32, and, if this judgement is negative, the processing of step S30 is repeated.

In step S32, when the selected operator completes preparations for remote driving, the CPU 40A transmits an authority receiving signal to the vehicle control device 20.

In step S34, the CPU 40A acquires the distance L (see FIG. 6) from the eyepoint of the operator selected from the storage 40D, to the image display surface 42A of the display device 42.

In step S36, the CPU 40A acquires vehicle information, i.e., the image of surroundings and behavior information (vehicle speed information, steering angle information, and the like) of the vehicle 12, from the vehicle control device 20.

Next, in step S38, on the basis of the distance L and the steering angle information of the vehicle 12, the CPU 40A sets the central visual field region 50. For example, in a case in which the steering wheel is operated at the time of a left turn of the vehicle 12, as illustrated in FIG. 8, the direction that is inclined toward the left side by an amount corresponding to the steering angle θ1 from the straight ahead direction C of the operator P as seen in plan view is made to be the sightline direction LV, and the range of the visual field angle θ2 (in the present exemplary embodiment, 20° as seen in plan view (10° to each of the left and the right of the center that is the sightline direction LV)) of the central visual field whose center is the sightline direction LV from the eyepoint of the operator, is made to be central visual field range CA. Note that, of the viewing angle in which the entire region of the image display surface 42A is viewed from the eyepoint of the operator as seen in plan view, the ranges (angles) at the left and the right, which are other than the central visual field range CA, are made to be peripheral visual field ranges PA (refer to FIG. 6 and FIG. 8).

The central visual field range CA on the image display surface 42A of the display device 42 is made to be the central visual field region 50. Specifically, as illustrated in FIG. 8, the central visual field region 50 (refer to the hatched portion in FIG. 9) on the image display surface 42A is set on the basis of the distance L, which is from the eyepoint of the operator P to the image display surface 42A of the display device 42, and the visual field angle θ2 (in the present exemplary embodiment, 20° as seen in plan view) of the central visual field whose center is sightline direction LV. Note that, in a case in which the steering angle is 0°, as illustrated in FIG. 6 and FIG. 7, the range of the visual field angle θ2 (in the present exemplary embodiment, 20° which is 10° to each of the left and the right), whose center is the sightline direction LV that is the straight ahead direction C, is made to be the central visual field region 50 (refer to the hatched portion in FIG. 7).

Figure 9:
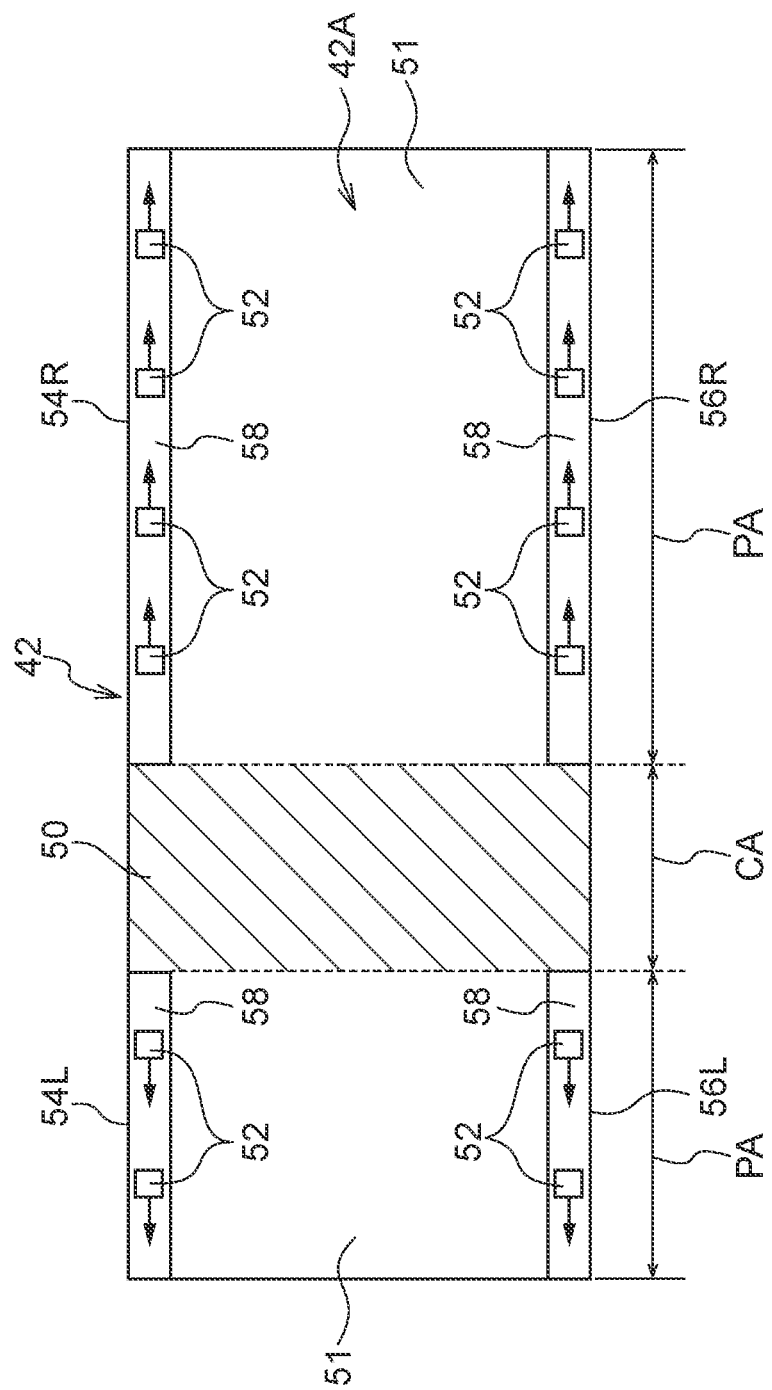
FIG. 9 is a drawing in which the image display surface of the display device at the time of a left turn operation is expanded.

Next, in step S40, as illustrated in FIG. 7 and FIG. 9, the CPU 40A sets the object display regions 54L through 56R that are on the image display surface 42A of the display device 42. Specifically, as illustrated in FIG. 7 and FIG. 9, the CPU 40A sets, on the image display surface 42A, the upper-side object display regions 54L, 54R that are ranges of a predetermined distance from the upper ends of the left and right both side portions (the peripheral visual field regions 51) that are other than the central visual field region 50, and the lower-side object display regions 56L, 56R that are ranges of a predetermined distance from the lower ends.

Figure 13:
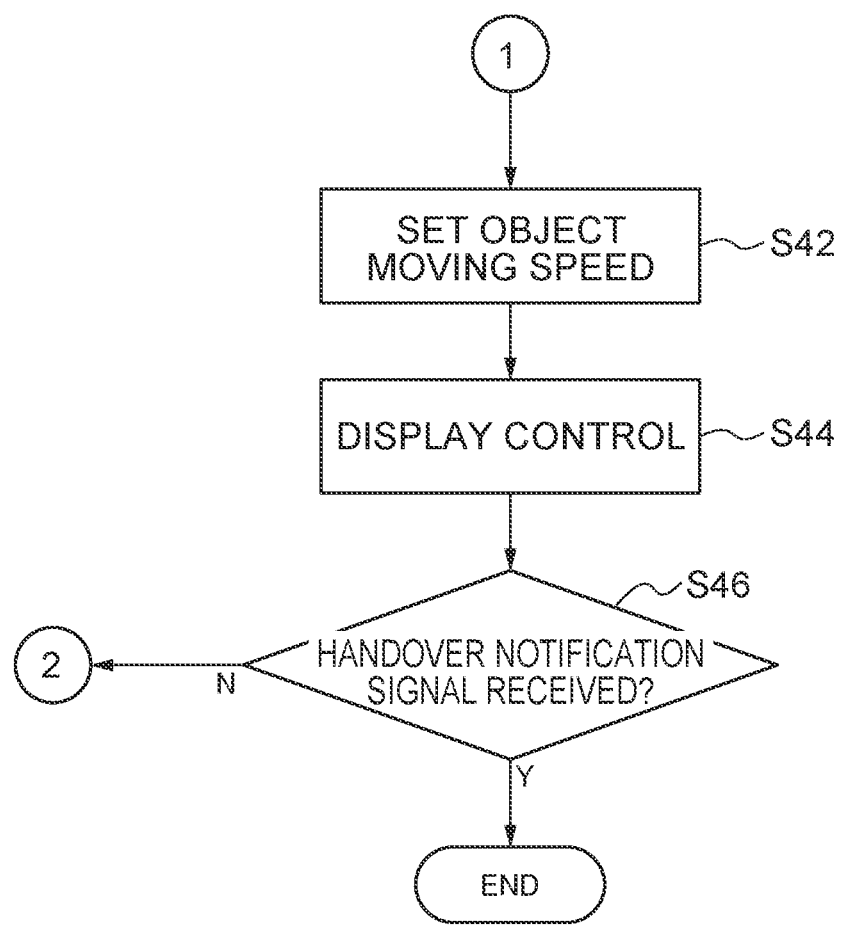
FIG. 13 is a flowchart illustrating the flow of processing that is executed by the remote operation device.

Moreover, in step S42 of FIG. 13, on the basis of the vehicle speed, the CPU 40A sets the moving speed of the objects 52 that are displayed in the object display regions 54L through 56R. At this time, the CPU 40A sets the moving speed such that it appears as if the objects 52 are moving at a constant speed on the image display surface 42A of the display device 42. Note that, in the present exemplary embodiment, the CPU 40A reads-out the moving speed of the objects 52 that corresponds to the vehicle speed, from a table that is stored in the storage 40D and in which relationships of correspondence between the vehicle speed and the moving speed of the objects 52 are set.

Next, in step S44, the CPU 40A displays the image of surroundings on the entire region of the image display surface 42A of the display device 42, and displays the objects 52 and the backgrounds 58 in the object display regions 54L through 56R in a manner of being superposed on the image of surroundings. At this time, the objects 52 are displayed so as to move in the respective object display regions 54L through 56R at the set moving speed from the central visual field region 50 side toward the left and right both ends (refer to the arrows in FIG. 7 and FIG. 9).

In step S46, the CPU 40A judges whether remote operation driving has ended, i.e., whether or not a handover notification signal has been received. If this judgment is affirmative, the series of controls ends, and, if this judgment is negative, processings from step S36 on are repeated.

In the remote operation system 10 relating to the present exemplary embodiment, the objects 52, which move at a moving speed corresponding to the vehicle speed from the central visual field region 50 side toward the left and right both end portions, are displayed in the object display regions 54L through 56R of the image display surface 42A of the display device 42 of the remote operation device 14 so as to be superimposed on the image of surroundings. Therefore, the operator can obtain an even better sense of the vehicle speed by viewing the movement of the objects 52.

In particular, at the image display surface 42A of the display device 42, the object display regions 54L through 56R are set in predetermined ranges from the upper end or the lower end of the image display surface 42A, at regions that are other than the central visual field region 50 in the left-right direction. Accordingly, the objects 52 that are displayed in the object display regions 54L through 56R are prevented from entering into the central visual field of the operator, and the remote driving operations of the operator being disturbed is suppressed.

Further, the orientation of the steering angle θ1 is considered to be the sightline direction of the operator, and the central visual field region 50 is set on the basis of the central visual field range CA that is the range of the visual field angle θ2 (20° in the present exemplary embodiment) of the central visual field whose center is the sightline direction LV that is oriented so as to be inclined by the steering angle θ1 from the straight ahead direction C as seen in plan view. As a result, even in a case in which the sightline of the operator is directed in the left-right direction, the central visual field region 50 moves left or right so as to follow this. Accordingly, because the object display regions 54L through 56R, which are provided at the peripheral visual field regions 51, also are displaced to the left or the right accompanying the movement of the central visual field region 50, even at times when the vehicle is turned, the objects 52 that are displayed in the object display regions 54L through 56R are prevented from entering into the central visual field of the operator, and the remote driving operations of the operator being disturbed is prevented or suppressed.

Moreover, in the present exemplary embodiment, by displaying the backgrounds 58 that are a single color in the object display regions 54L through 56R so as to be superimposed on the image of surroundings, the image of surroundings is no longer seen by the operator in the object display regions 54L through 56R. Namely, the objects 52 are displayed on the backgrounds 58 in the object display regions 54L through 56R as well, and differences arising in the way of viewing the objects 52 is prevented. As a result, the way of viewing the objects 52 in the respective object display regions 54L through 56R is the same, and it is even easier for the operator to feel a sense of the speed of the vehicle 12.

Further, in the present exemplary embodiment, the object display regions 54L through 56R are set at portions of the image display surface 42A of the display device 42 that displays the image of surroundings, and the objects 52 are displayed in these object display regions 54L through 56R. Namely, displaying of the objects 52 can be added to the existing remote operation device 14 merely by changing the image display control program for the display device 42 that displays the image of surroundings. Accordingly, the existing remote operation device 14 can be made able to display the objects 52 at a low cost, without adding a new display device.

Moreover, in the present exemplary embodiment, because the moving speed of the objects 52 is changed so as to correspond to the vehicle speed, it is easy for the operator to intuitively recognize changes in the vehicle speed.

Variations of the present exemplary embodiment are described. Note that, what differs from the above-described exemplary embodiment is only the point that the sightline of the operator is sensed at the remote operation device 14, and therefore, only this point is described. Further, structural elements that are similar to those of the above-described exemplary embodiment are denoted by the same reference numerals, and detailed description thereof is omitted.

Figure 14:
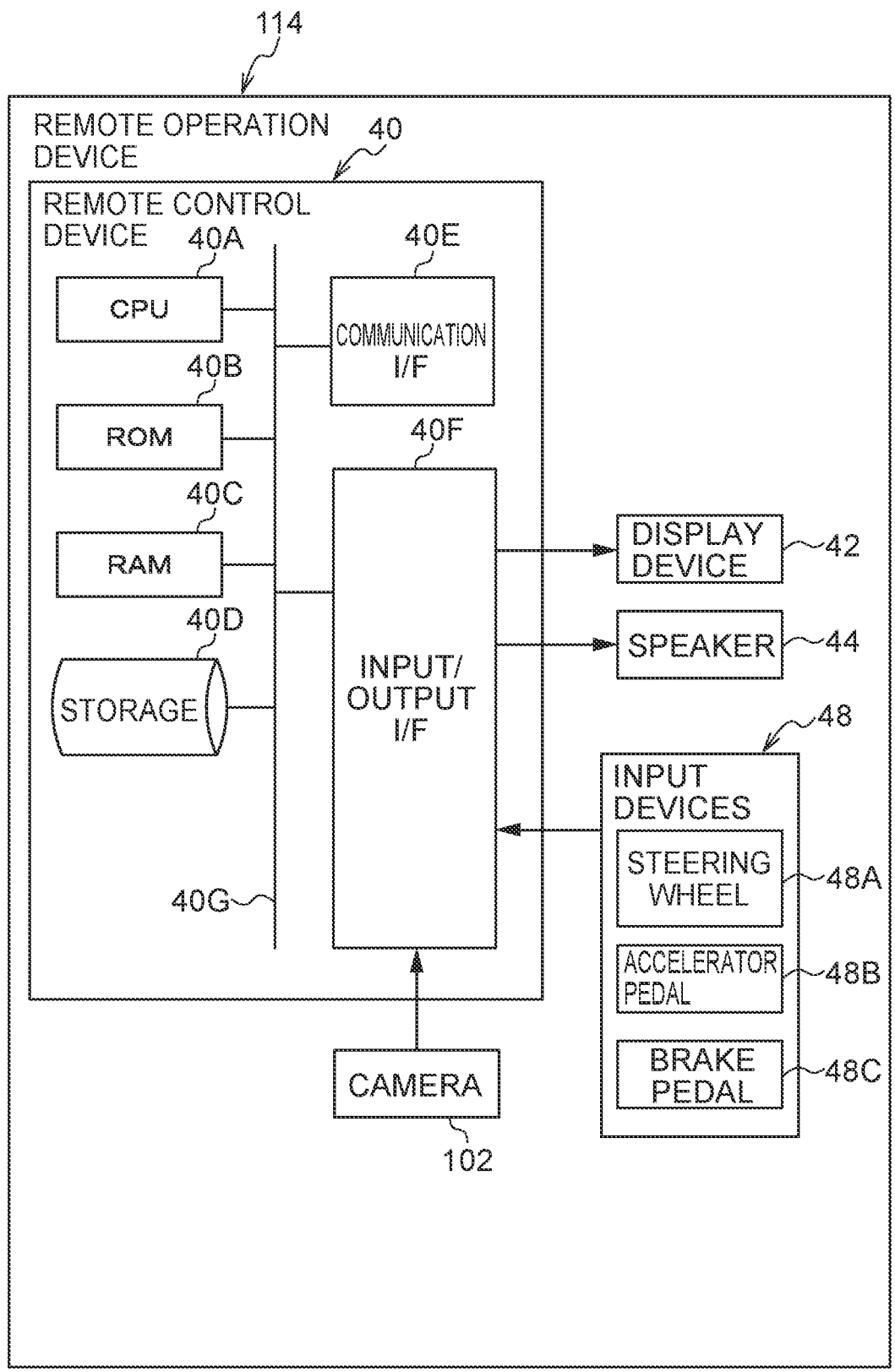
FIG. 14 is a block drawing illustrating hardware configuration of a remote operation device relating to a variation.

As illustrated in FIG. 14, a remote operation device 114 has a camera 102 that captures images of the face of the operator who is seated directly in front of the image display surface 42A of the display device 42.

Figure 15:
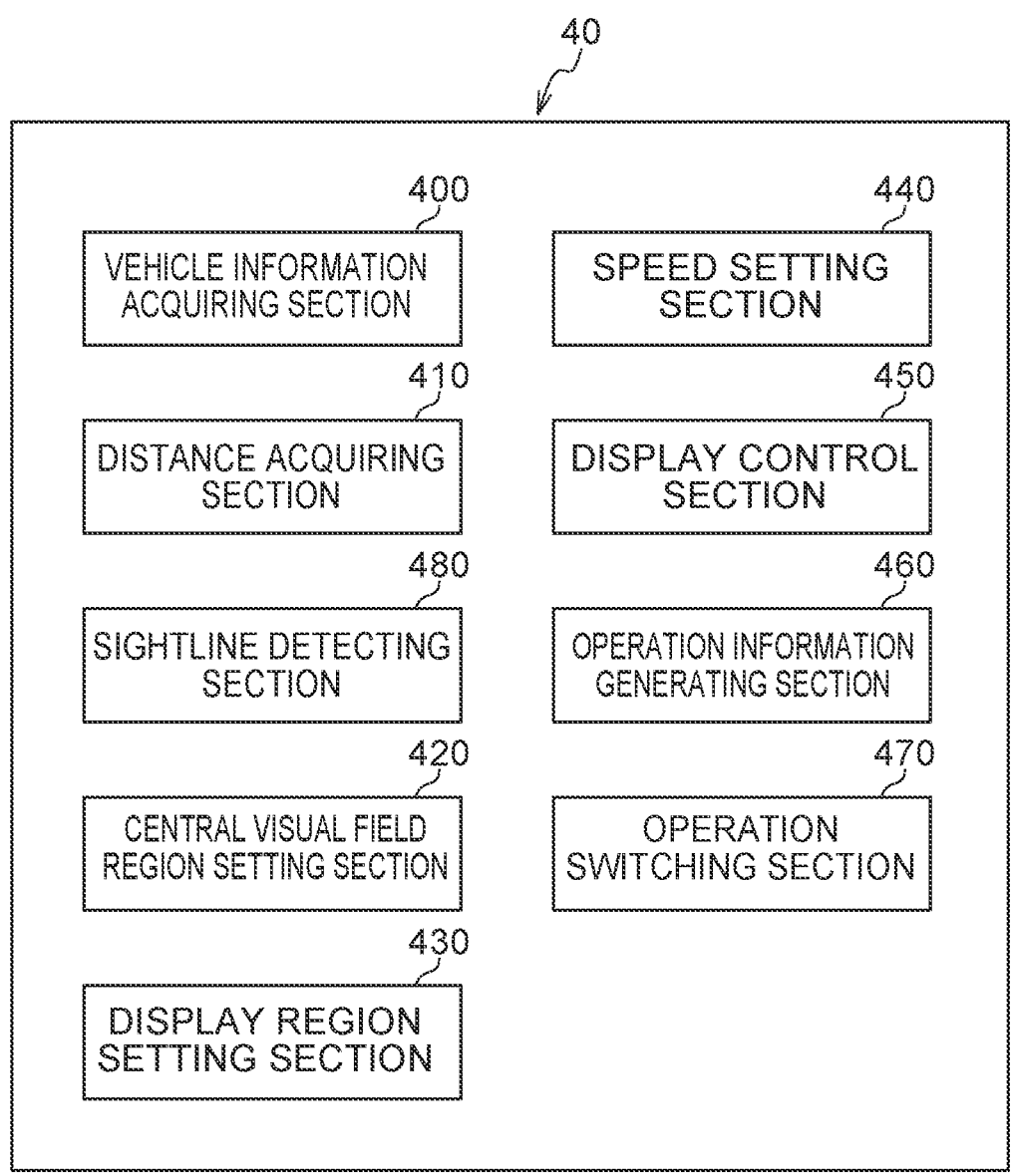
FIG. 15 is a block drawing illustrating functional configuration of a remote control device that the remote operation device relating to the variation has.

Further, as illustrated in FIG. 15, the CPU 40A of the remote control device 40 has a sightline detecting section 480 that senses the sightline direction LV (see FIG. 8) of the operator from the captured image of the face of the operator that is captured by the camera 102.

Moreover, the central visual field region setting section 420 sets a range, which is on the image display surface 42A of the display device 42 and is of the visual field angle θ2 (20° in the present variation) whose center is the sightline direction LV detected by the sightline detecting section 480, to be the central visual field region 50.

In the present variation, the remote operation device 114 sets the sightline direction LV of the operator on the basis of the captured image of the face of the operator that is captured by the camera 102, instead of on the basis of the steering angle. On the basis of this sightline direction LV, the remote operation device 114 sets the central visual field region 50 and the object display regions 54L through 56R.

Accordingly, in the present variation, the central visual field region 50 on the image display surface 42A of the display device 42 coincides even more with the central visual field of the operator.

In this way, in the remote operation device 114, the objects 52 are even more reliably prevented from entering into the central visual field of the operator, and the operator can view the peripheral visual fields well (can carry out remote operation driving well), and the operator can obtain a sense of the vehicle speed.

Figure 16:
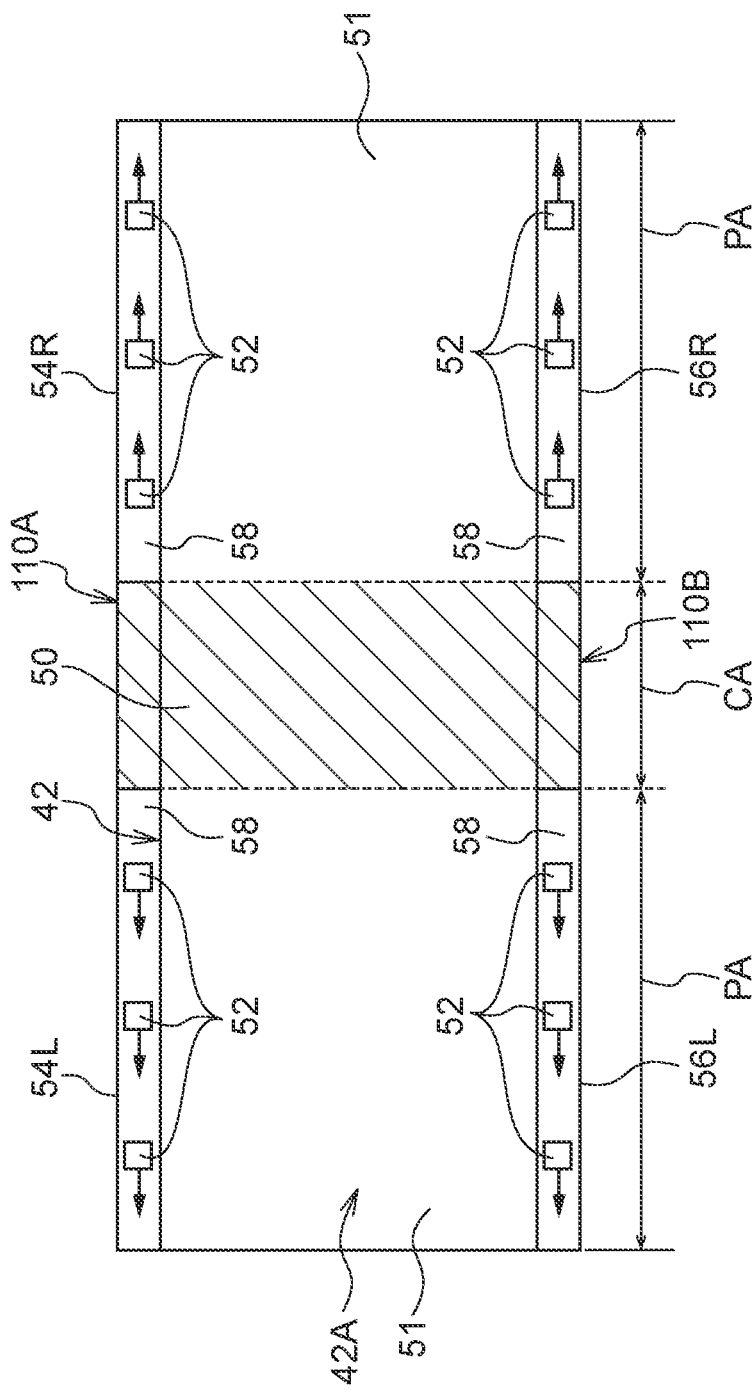
FIG. 16 is a drawing in which an image display surface of a display device relating to another example is expanded.

In the above-described exemplary embodiment, portions of the image display surface 42A of the display device 42 of the remote operation device 14 are made to be the object display regions 54L through 56R, and the objects 52 and the like are displayed in a manner of being superimposed on the image of surroundings. However, it can also be thought to provide displays for displaying the objects, separately from the display device 42 that displays the image of surroundings. For example, as illustrated in FIG. 16, it can be thought to provide object display devices 110A, 110B that are adjacent to the upper portion and the lower portion of the display device 42 and that are predetermined heights and have lengths that are the same as the entire width of the display device 42. In this case as well, at the respective object display devices 110A, 110B, the object display regions 54L through 56R are provided respectively at the left and the right of the central visual field region 50.

Figure 17:
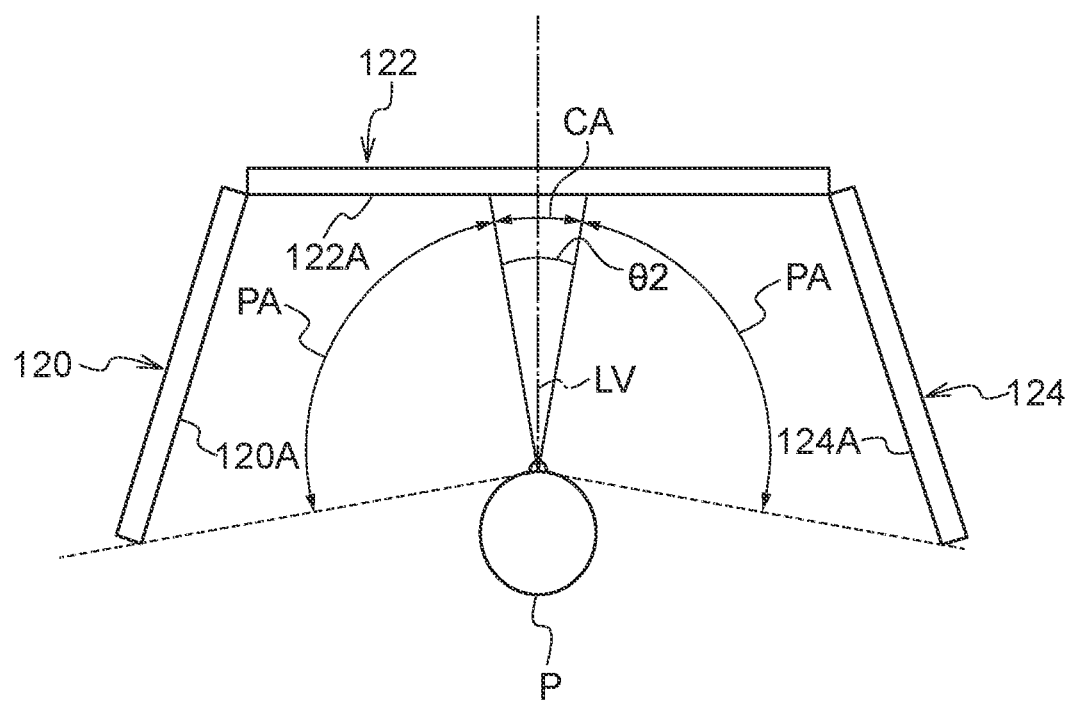
FIG. 17 is a schematic plan view in which a display device relating to another example is viewed from above.
Figure 18:
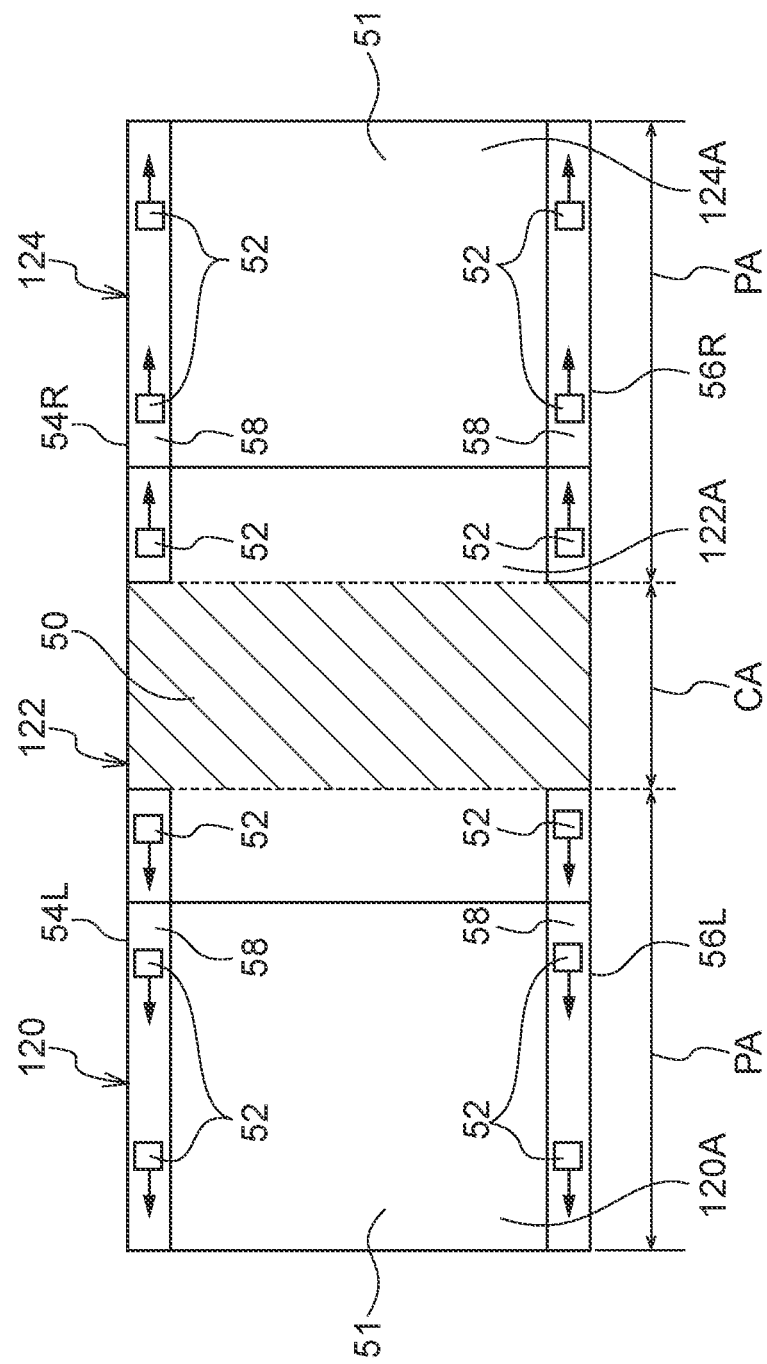
FIG. 18 is a drawing in which an image display surface of the display device relating to the other example is expanded.

Further, in the above-described exemplary embodiment, the display device 42 is described as a single, curved display. However, the present disclosure is not limited to this. For example, as illustrated in FIG. 17, the display device may be configured by display devices 120, 122, 124 that are configured by three displays that are shaped as flat plates. In this case as well, as illustrated in FIG. 18, a continuous surrounding image is displayed on image display surfaces 120A, 122A, 124A of the three display devices 120, 122, 124, and the object display regions 54L through 56R are set at predetermined positions other than the central visual field region 50.

Moreover, although the object display regions 54L through 56R are provided at the upper side and the lower side of the image display surface 42A of the display device 42 in the above-described exemplary embodiment, the object display regions may be provided at either one of the upper side and the lower side.

Further, in the above-described exemplary embodiment, the backgrounds 58 that are a single color are displayed in a superposed manner in the entireties of the object display regions 54L through 56R such that the image of surroundings cannot be seen by the operator thereat. However, the present disclosure is not limited to this, and the objects 52 only may be displayed on the image of surroundings.

Moreover, in the above-described exemplary embodiment, the vehicle 12 is configured such that manual driving and remote driving can be executed, but the vehicle is not particularly limited provided that remote driving thereof is possible. For example, the vehicle 12 may be such that manual driving, autonomous driving and remote driving can be executed, or may be such that only remote driving can be executed.

Further, although the visual field angle θ 2 of the central visual field is made to be 20° in plan view in the above-described exemplary embodiment, the present disclosure is not limited to this.

Further, any of various types of processors other than a CPU may execute the respective processings that are executed due to the CPUs 20A, 40A, 60A, 80A reading software (programs) in the above-described exemplary embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit configuration that are designed for the sole purpose of executing specific processings such as ASICs (Application Specific Integrated Circuits) and the like, and the like. Further, the respective processings may be executed by one of these various types of processors, or may be executed by a combination of two or more of the same type or different types of processors (e.g., plural FPGAs, or a combination of a CPU and an FPGA, or the like). Further, the hardware configuration of these various types of processors are, more specifically, electrical circuits that combine circuit elements such as semiconductor elements and the like.

Further, the above exemplary embodiment describes a form in which the programs are stored in advance (are installed) on a computer-readable, non-transitory recording medium. For example, in the remote operation system 10, the programs are stored in advance in the storage 40D. However, the present disclosure is not limited to this, and the programs may be provided in forms of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the respective programs may be in forms that are downloaded from an external device over a network.

The flows of the processings that are described in the above-described exemplary embodiment also are examples, an unnecessary steps may be deleted therefrom, new steps may be added thereto, or the order of the processings may be rearranged, within a scope that does not depart from the gist of the present invention.

In addition, the present invention can be implemented by being modified in various ways within a scope that does not depart from the gist thereof. Further, the scope of the present invention, of course, is not limited to the above-described exemplary embodiment.

What is claimed is:

1. A remote operation device that drives a vehicle by remote operation exterior to the vehicle, comprising:
    a memory; and
    a processor coupled to the memory, the processor being configured to:
    acquire an image of surroundings of the vehicle from the vehicle;
    display the image of the surroundings on a first display portion;
    display, on second display portions that are provided at peripheral visual field regions, which are other than a central visual field region of the first display portion, at at least one of an upper side or a lower side of the first display portion, objects that move from the central visual field region side toward transverse direction end portions; and
    acquire sightline information, with respect to the first display portion, of an operator of the remote operation device, and
    set the central visual field region on the basis of the sightline information.

2. The remote operation device of claim 1, wherein the processor is configured to:
    acquire steering angle information of the vehicle, and
    set the central visual field region on the basis of the steering angle information.

3. The remote operation device of claim 2, wherein the processor is configured to set the central visual field region on the basis of a distance from an eyepoint of an operator of the remote operation device to the first display portion.

4. The remote operation device of claim 1, wherein a moving speed of the objects changes in accordance with a vehicle speed of the vehicle.

5. A remote driving system comprising:
    the remote operation device of claim 1; and
    a vehicle driven by operation of the remote operation device.

6. A remote operation method for driving a vehicle by remote operation exterior to the vehicle, the method comprising, via a computer:
    causing an image acquiring section to acquire, from the vehicle, an image of surroundings of the vehicle;
    causing a first display portion to display the image of the surroundings of the vehicle;
    causing second display portions that are provided at peripheral visual field regions, which are other than a central visual field region of the first display portion, at at least one of an upper side or a lower side of the first display portion, to display objects that move from the central visual field region side toward transverse direction end portions;
    acquiring sightline information, with respect to the first display portion, of an operator of the remote operation device, and setting the central visual field region on the basis of the sightline information.

7. A non-transitory computer-readable medium storing a remote operation program executable by a computer to execute processing at a remote operation device that drives a vehicle by remote operation exterior to the vehicle, the processing comprising:

causing an image acquiring section to acquire, from the vehicle, an image of surroundings of the vehicle;

causing a first display portion to display the image of surroundings of the vehicle;

causing second display portions that are provided at peripheral visual field regions, which are other than a central visual field region of the first display portion, at at least one of an upper side or a lower side of the first display portion, to display objects that move from the central visual field region side toward transverse direction end portions;

acquiring sightline information, with respect to the first display portion, of an operator of the remote operation device, and setting the central visual field region on the basis of the sightline information.

* * * * *